Patented Oct. 31, 1933

1,932,390

UNITED STATES PATENT OFFICE 1,932,390

HARD RUBBER LIKE MASSES

Waldemar Zieser, Leverkusen, Germany, assignor to I. G. Farbenindustrie Aktiengesellschaft, Frankfort-on-the-Main, Germany, a corporation of Germany No Drawing. Application June 23, 1930, Serial No. 463,371, and in Germany July 5, 1929

3 Claims. (Cl. 106—23)

The present invention relates to new hard rubber-like masses derived from mixtures of a natural rubber variety and an artificial rubber-like mass derived from butadiene-(1.3).

In accordance with the invention technically valuable hard rubber-like masses are obtainable by mixing in any desired manner, for example by rolling or kneading, a natural rubber variety and an artificial rubber-like mass derived from butadiene-(1.3), and vulcanizing the mixture after the addition of sulfur in an amount of between about 25–60% by weight (calculated upon the rubber/rubber-like mass mixture). The artificial rubber-like masses suitable for the manufacture of my new hard rubber-like masses can be prepared by polymerizing butadiene-(1.3) in any desired manner, the best results being obtained when applying polymerizates manufactured by polymerizing butadiene in the presence of an alkali metal, especially sodium metal. The ratio between the amounts of natural rubber and the amount of the rubber-like mass should be such that the mixture contains between about 40–80% by weight of natural rubber (calculated upon the rubber/artificial rubber-like mass mixture). Vulcanization can be performed, for example, by rolling into the mixture sulfur and if desired other ingredients known to favorably influence vulcanization processes or the quality of the vulcanizates, such as filling materials, vulcanization accelerators, dyestuffs, etc. and vulcanizing in the usual manner, for example, by heating to temperatures between about 120–160° C.

The hard-rubber like masses thus obtainable generally surmount, as regards their mechanical properties, such as tensile strength, sagging strength and resistance to work resulting from a blow or percussion, natural hard rubber as well as artificial rubber-like masses. Furthermore, my new vulcanizates are superior to natural hard rubber regarding their resistance to heat and to the attack by chemical agents.

The following examples illustrate my invention without limiting it thereto, the parts being by weight.

Example 1

A mixture is prepared on rollers from 50 parts of smoked sheets, 50 parts of a rubber-like mass obtained by polymerizing butadiene in the presence of sodium metal, 75 parts of sulfur, 1 part of the piperidine salt of piperidine dithiocarbamic acid, 150 parts of ground pumice and 5 parts of lime. The mixture is then vulcanized at a temperature of 150° C. for a period of 90 minutes. A hard rubber-like mass is thus obtained showing good resistance to heat and to the attack of chemical agents.

Example 2

120 parts of sulfur (150 parts respectively in test b), 20 parts of factis, 6 parts of diphenyl-guanidine, 20 parts of lime, 20 parts of magnesium oxide and 424 parts of ground pumice are rolled (a) into 320 parts of smoked sheets, (b) into a mixture of 220 parts of smoked sheets with 100 parts of an artificial rubber-like mass obtained by polymerizing butadiene in the presence of sodium metal. Mixtures (a) and (b) are then vulcanized by heating to 151° C. for a period of 90 minutes. The vulcanizates thus obtainable possess the following mechanical properties:

|  | a | b |
|---|---|---|
| Tensile strength | 203 kg/sqcm. | 215 kg/sqcm. |
| Sagging strength | 33,6 kg/sqcm. | 35,6 kg/sqcm. |
| Resistance to work resulting from a blow or percussion. | 0,034 mtr/kg. | 0,041 mtr/kg. |

The mechanical properties of the vulcanizate (b) are far superior to those of a hard rubber-like mass derived from the butadiene sodium polymerizate itself and are, as seen from the above table, even superior to those of natural hard rubber. Furthermore, the mixed hard rubber-like mass of this example exerts good resistance to heat and to the attack by chemical agents and in this respect is far superior to natural hard rubber.

I claim:—

1. Hard rubber-like masses, the characteristic of which is that they contain an artificial rubber-like mass obtained by polymerizing butadiene-(1.3) in the presence of an alkali metal, natural rubber in an amount between about 40–80% by weight of the rubber/rubber-like mass mixture and sulfur in an amount between about 25–60% by weight of the rubber/rubber-like mass mixture.

2. Hard rubber-like masses, the characteristic of which is that they contain an artificial rubber-like mass obtained by polymerizing butadiene-(1.3) in the presence of sodium metal, natural rubber in an amount between about 40–80% by weight of the rubber/rubber-like mass mixture and sulfur in an amount between about 25–60% by weight of the rubber/rubber-like mass mixture.

3. Hard rubber-like masses, the characteristic of which is that they contain 220 parts by weight of natural rubber, 100 parts by weight of butadiene-sodium rubber and 150 parts by weight of sulfur.

WALDEMAR ZIESER.